(12) United States Patent
Pandian

(10) Patent No.: US 7,477,603 B1
(45) Date of Patent: Jan. 13, 2009

(54) SHARING LINE BANDWIDTH AMONG VIRTUAL CIRCUITS IN AN ATM DEVICE

(75) Inventor: Senthil Kumar Pandian, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 1272 days.

(21) Appl. No.: 10/614,209

(22) Filed: Jul. 8, 2003

(51) Int. Cl.
*G01R 31/08* (2006.01)

(52) U.S. Cl. ............ 370/235; 370/253; 370/395.4
(58) Field of Classification Search ........... 370/395, 370/395.4
See application file for complete search history.

(56) References Cited

U.S. PATENT DOCUMENTS

| | | | |
|---|---|---|---|
| 5,179,556 A * | 1/1993 | Turner | 370/233 |
| 5,533,009 A * | 7/1996 | Chen | 370/232 |
| 6,049,526 A * | 4/2000 | Radhakrishnan et al. | 370/229 |
| 6,219,352 B1 | 4/2001 | Bonomi et al. | |
| 6,396,834 B1 | 5/2002 | Bonomi et al. | |
| 6,560,196 B1 * | 5/2003 | Wei | 370/230.1 |
| 2001/0008529 A1 * | 7/2001 | Ukon | 370/395 |
| 2003/0231635 A1 * | 12/2003 | Kalkunte et al. | 370/395.42 |

OTHER PUBLICATIONS

U.S. Appl. No. 09/569,907, filed May 11, 2000, John Ah Sue et al.

* cited by examiner

*Primary Examiner*—Seema S Rao
*Assistant Examiner*—Sai-Ming Chan
(74) *Attorney, Agent, or Firm*—Narendra Reddy Thappeta

(57) ABSTRACT

Support for over-subscription while maintaining priorities (e.g., CBR, VBR RT, VBR nRT, UBR, in that order from high to low) and ensuring that each virtual circuit does not exceed any allocated bandwidth. In an embodiment, a line slot credit is maintained associated with each virtual circuit, which is incremented by a token value (equivalent to a cell slot for transmission on the communication path) in each cell slot. When the line slot credit equals or exceeds a inter-cell delay for the virtual circuit, a VC-credit associated with the virtual circuit is incremented unless the VC-credit value would exceed any maximum threshold value. Cells are transmitted (for VC-types with allocated bandwidths) if the associated VC-credit is at least one, while maintaining priorities by VC-type. PCR may also be enforced on VBR and UBR VC-types.

45 Claims, 9 Drawing Sheets

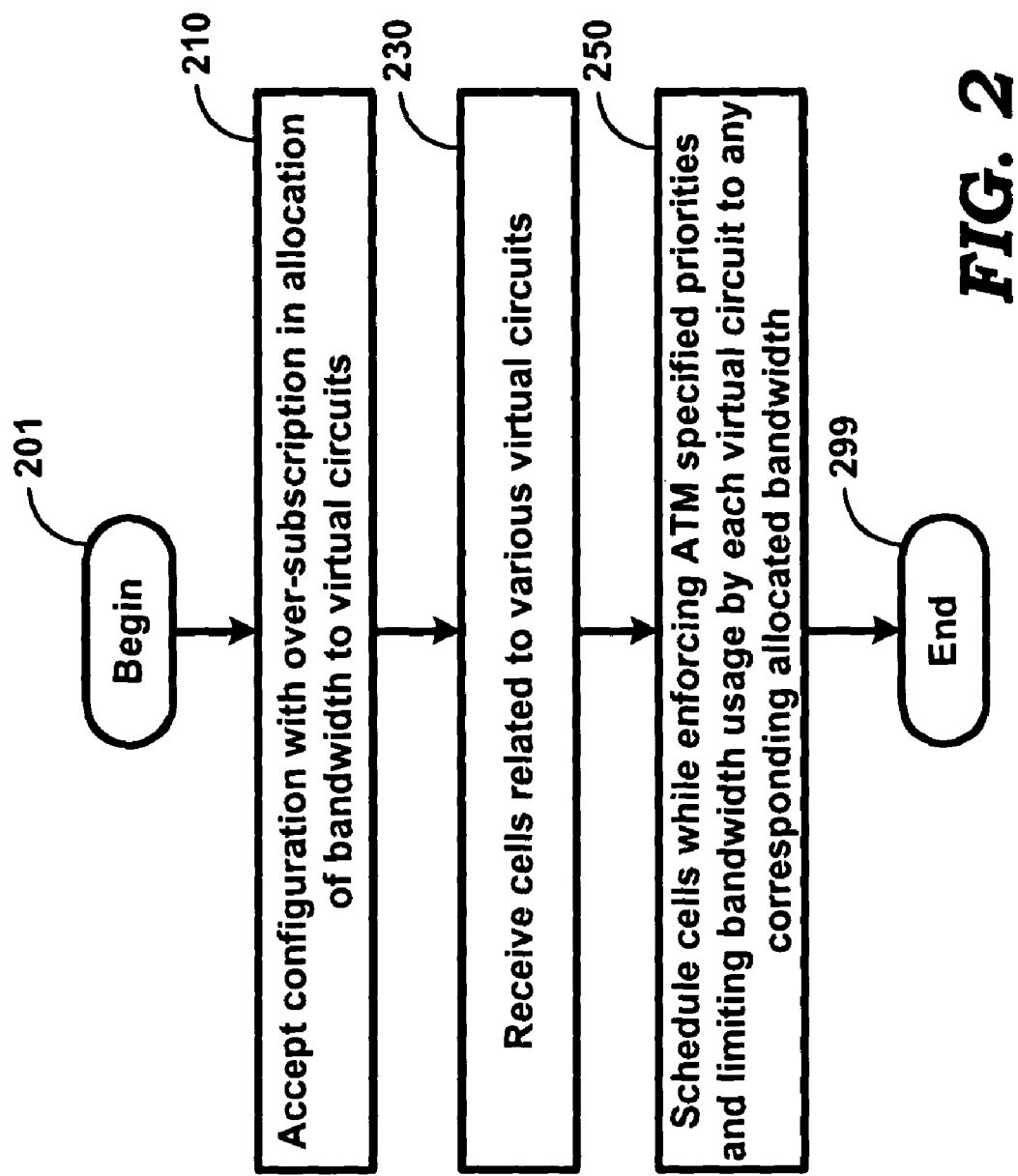

| | 401 | 402 | 403 | 404 | 405 | 406 | 407 | 408 |
|---|---|---|---|---|---|---|---|---|
| Line_Slot_Credit | 100 | 200 | 100 | 200 | 100 | 200 | 100 | 200 |
| Cell Slot | 0 | VCI | 0 | VC1 | 0 | VC1 | 0 | VC1 |
| Line_Slot_balance | 100 | 0 | 100 | 0 | 100 | 0 | 100 | 0 |
| Cell Spacing | idle | VC1 | idle | VC1 | idle | VC1 | idle | VC1 |
| Transmitted Cell | idle | idle | idle | idle | idle | idle | idle | idle |
| VC-Credit | 0 | 1 | 1 | 2 | 2 | 3 | 3 | 3 |

| | 451 | 452 | 453 | 454 | 455 | 456 | 457 | 458 | 459 | 460 |
|---|---|---|---|---|---|---|---|---|---|---|
| Line_Slot_Credit | 100 | 200 | 175 | 150 | 125 | 100 | 200 | 175 | 150 | 125 |
| Cell Slot | 0 | CBR | CBR | CBR | CBR | 0 | CBR | CBR | CBR | CBR |
| Line_Slot_balance | 100 | 75 | 50 | 25 | 0 | 100 | 75 | 50 | 25 | 0 |
| Line_Slot_Credit | 100 | 200 | 100 | 200 | 100 | 200 | 100 | 200 | 100 | 200 |
| Cell Slot | 0 | VBR/-nRT | 0 | VBR/-nRT | 0 | VBR/-nRT | 0 | VBR/-nRT | 0 | VBR/-nRT |
| Line_Slot_balance | 100 | 0 | 100 | 0 | 100 | 0 | 100 | 0 | 100 | 0 |
| Cell Spacing | idle | CBR/VBR-nRT | CBR | CBR | CBR | VBR-nRT | CBR | CBR/VBR-nRT | CBR | CBR/VBR-nRT |
| Transmitted Cell | idle | CBR | CBR | CBR | CBR | VBR-nRT | VBR-nRT | VBR-nRT | idle | VBR-nRT |
| VC-Credit (CBR) | 0 | 1+0-0=1 | 1+0-0=1 | 1+1-0=2 | 2+0-1=1 | 1+1-1=1 | 1+0-1=0 | 0+1-1=0 | 1 | 0+0-0=0 | 0+1-1=0 |
| VC-Credit (VBR-nRT) | 0 | 0+1-0=1 | 0 | 1+1-0=2 | 0 | 1 | 1 | 1 | 1 | 1 |

*FIG. 4B*

| | 471 | 472 | 473 | 474 | 475 | 476 | 477 | 478 | 479 | 480 | 481 | 482 | 483 | 484 | 485 | 486 | 487 | 488 | 489 | 490 | 491 |
|---|---|---|---|---|---|---|---|---|---|---|---|---|---|---|---|---|---|---|---|---|---|
| Line_Slot_Credit | 100 | 200 | 175 | 150 | 125 | 100 | 200 | 175 | 150 | 125 | | | | | | | | | | | |
| Cell Slot | 0 | CBR | CBR | CBR | CBR | 0 | CBR | CBR | CBR | CBR | | | | | | | | | | | |
| Line_Slot_balance | 100 | 75 | 50 | 25 | 0 | 100 | 75 | 50 | 25 | 0 | | | | | | | | | | | |
| Line_Slot_Credit | 100 | 200 | 100 | 200 | 100 | 200 | 100 | 200 | 100 | 200 | | | | | | | | | | | |
| Cell Slot | 0 | VBR-nRT | 0 | VBR-nRT | 0 | VBR-nRT | 0 | VBR-nRT | 0 | VBR-nRT | | | | | | | | | | | |
| Line_Slot_balance | 100 | 0 | 100 | 0 | 100 | 0 | 100 | 0 | 100 | 0 | | | | | | | | | | | |
| Cell Spacing | idle | CBR / VBR-nRT | CBR | CBR / VBR-nRT | CBR | VBR-nRT | CBR | CBR / VBR-nRT | CBR | CBR / VBR-nRT | | | | | | | | | | | |
| Peak_Slot_credit | 100 | 200 | 200 | 200 | 200 | 158 | 116 | 200 | 158 | 116 | | | | | | | | | | | |
| Transmitted Cell | idle | CBR | CBR | CBR | VBR-nRT | VBR-nRT | Idle | VBR-nrt | VBR-nRT | Idle | | | | | | | | | | | |
| Peak_Slot_balance | 100 | 200 | 200 | 200 | 58 | 16 | 116 | 58 | 16 | 116 | | | | | | | | | | | |
| VC-Credit (VBR-nRT) | 0 | 0+1-0=1 | 1+0-0=1 | 1+1-0=2 | 2+0-1=1 | 1+1-1=1 | 1+0-0=1 | 1+1-1=1 | 1+0-1=0 | 0+1-0=1 | | | | | | | | | | | |

*FIG. 4C*

SHARING LINE BANDWIDTH AMONG VIRTUAL CIRCUITS IN AN ATM DEVICE

RELATED APPLICATION

The present application is related to the commonly assigned co-pending US application entitled, "A method for scheduling data for communication on a digital subscriber line", Ser. No. 09/569,907, Filed: May 11, 2000.

BACKGROUND OF THE INVENTION

1. Field of the Invention

The present invention relates to telecommunication networks, and more specifically to a method and apparatus for sharing line bandwidth among virtual circuits in an asynchronous transfer mode (ATM) device.

2. Related Art

Asynchronous transfer mode (ATM) based networks generally contain several ATM devices (e.g., switches, edge routers) connected by communication paths. Each path is generally characterized by an amount of bandwidth ("line bandwidth"), which is shared by several virtual circuits as is well known in the relevant arts.

Such sharing needs to be implemented while meeting/balancing various requirements. For example, it is generally desirable that certain types of virtual circuits (e.g., of constant bit rate type) be provided higher priority than certain other types of virtual circuits (e.g., of available bit rate type). ATM standards may specify such priorities.

Another generally desirable feature is support for over-subscription. Over subscription generally refers to a situation in which the aggregate allocated bandwidth for all virtual circuits active on a path exceeds the line bandwidth of the path.

BRIEF DESCRIPTION OF THE DRAWINGS

The present invention will be described with reference to the accompanying drawings, wherein:

FIG. 2 is a flow chart illustrating a method in accordance with the present invention.

FIG. 4A is a table illustrating the manner in which cells are scheduled for transmission when the bandwidth on a path is not over-subscribed in an embodiment of the present invention.

FIG. 4B is a table illustrating the manner in which cells are scheduled for transmission when the bandwidth on a path is over-subscribed in an embodiment of the present invention.

FIG. 4C is a table illustrating the manner in which peak cell rate (PCR) can be enforced according to an aspect of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview and Discussion of the Invention

An ATM device implemented according to an aspect of the present invention enables over-subscription while limiting bandwidth usage by each virtual circuit to corresponding allocated bandwidth and enforcing priorities as specified by ATM standards. That is, a queued cell on a virtual circuit with allocated bandwidth is not scheduled for transmission until the turn of the virtual circuit arrives according to the allocated bandwidth. In addition, cells related to CBR, VBR-RT, VBR-nRT and UBR VC-types (virtual circuit type) are scheduled for transmission in that priority, as specified by ATM standards.

In an embodiment described below, such features are attained by maintaining counters which indicate a number of cells that may need to be transmitted for each virtual circuit according to the corresponding allocated bandwidth and the VC-type (virtual circuit type). A cell on a virtual circuit with allocated bandwidth is transmitted only if the associated counter has a positive value (i.e., one or more). If multiple virtual circuits have counters with positive value, cells related to VC-types of higher priority are transmitted on the shared path. Cells related to VC-types with no allocated bandwidth (e.g., UBR) are transmitted only if the counters related to virtual circuits with allocated bandwidth are equal to zero.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
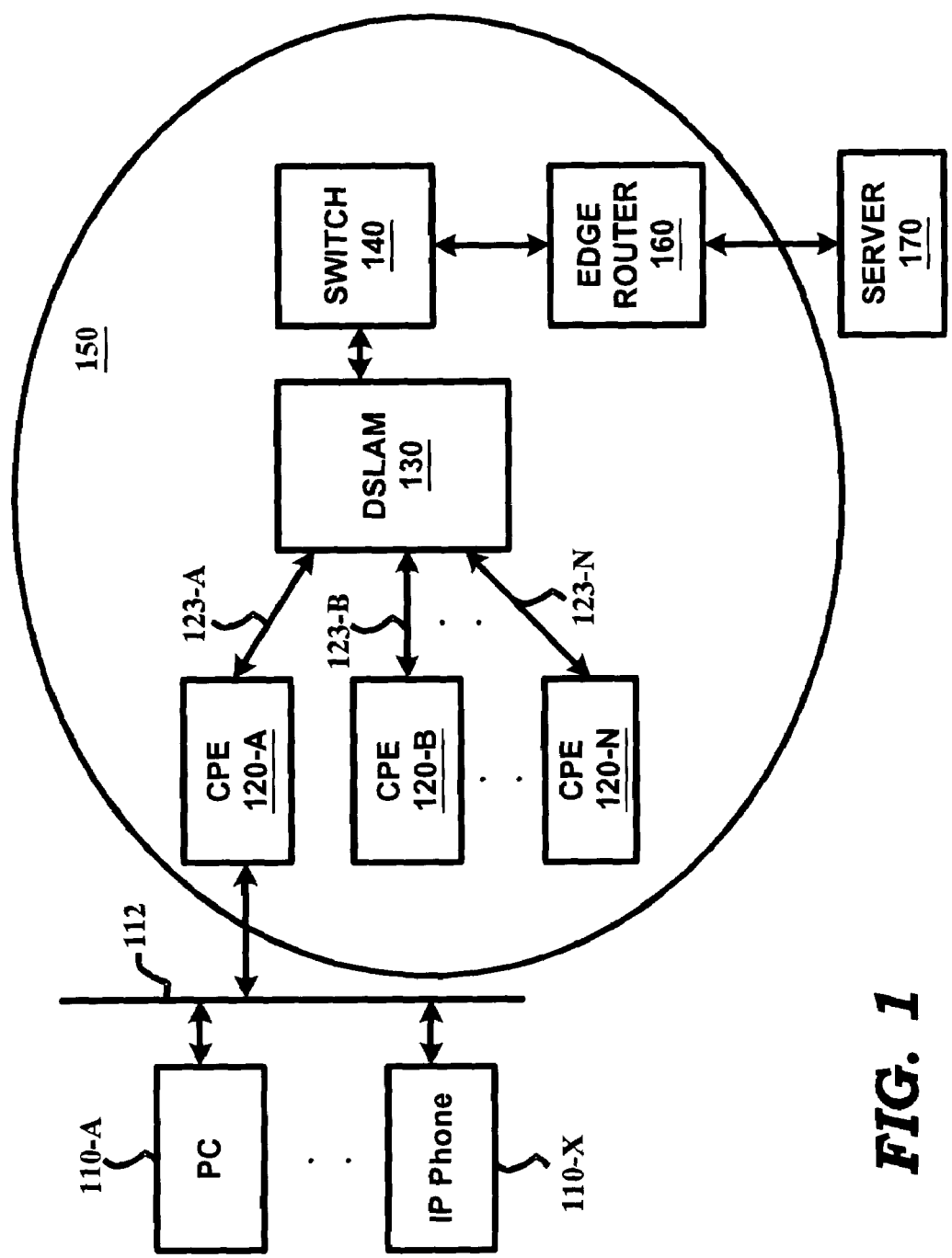
FIG. 1 is a block diagram illustrating an example environment in which the present invention can be implemented.

FIG. 1 is a block diagram illustrating an example environment in which the present invention can be implemented. The environment is shown containing personal computer (PC) system 100-A, IP phone 110-X, network 150, and server 170. Each component is described below in further detail.

PC 110-A accesses server 170 and IP phone 110-X may be used to place a voice call using network 150. As may be appreciated, CBR type virtual circuits may be suitable for voice calls and UBR/VBR virtual circuits are suitable for PC accesses. In general, the environment may contain several devices, each with potentially different requirements (in terms of virtual circuit type, QoS parameters, etc.).

Network 150 provides connectivity between various devices using an appropriate protocol. Network 150 is shown containing customer premise equipment (CPEs) 120-A through 120-N, telephone lines 123-A through 123-N, digital subscriber loop access multiplexor (DSLAM) 130, switch 140 and edge router 160. PC 110-A and IP phone 110-X are shown connected to CPE 120-A by a local area network (LAN) 112.

The environment is shown containing only a few representative components for illustration. In reality, each environment typically contains many more components. CPE 120-A through 120-N are described with reference to CPE 120-A only for conciseness. Similarly, telephone lines 123-A through 123-N are described with reference to telephone line 123-A. CPE-120-A, switch 140 and edge router 160 are examples of ATM devices. The operation of the various devices in network 150 is described below in further detail.

CPE 120-A receives data packets generated by applications executed in PC 110-A through 110-N on LAN 112, and forwards the received data packets (ATM cells) to DSLAM 130. CPE 120-A receives data packets from DSLAM 130 (on 123-A), and forwards (the data in) each received packet to an appropriate user system. In one embodiment, the communication between PC/IP phone and CPE 120-A is implemented using Internet Protocol (IP), in the paths from CPE 120-A to edge router 160 using ATM, and between edge router 160 and server 170 using IP.

DSLAM 130 receives data packets (e.g., ATM cells) from CPEs 120-A through 120-N, and sends the received packets to switch 140. Similarly, DSLAM 130 receives packets from switch 140, and sends the received packets to a corresponding CPE (on a corresponding telephone line).

Switch 140 may receive ATM cells from both DSLAM 130 and edge router 160. The ATM cells received from user systems (via corresponding CPE and DSLAM 130) are forwarded to edge router 160 and cells from edge router 160 are forwarded to DSLAM 130 (generally based on the ATM header).

Edge router 160 receives ATM cells from switch 140, combines the payload in multiple cells into a single IP packet, and forwards each IP packet to server 170. Similarly, data in packets from server 170 may be packaged into multiple cells, and the cells are forwarded to switch 140.

From the above, it may be appreciated that virtual circuits may be set up between CPE 120-A and edge router 160 at least to support the data transfers noted above. Each of the ATM devices (CPE, DSLAM, switch and edge router) may be in the path of many virtual circuits. As noted above in the background section, the virtual circuits may need to be supported while supporting various requirement. The manner in which virtual circuits may be supported according to various aspects of the present invention is described below in further detail.

3. Method

FIG. 2 is a flow chart illustrating a method in accordance with the present invention. The method is described below with reference to switch 140 of FIG. 1 for illustration. However, the method may be implemented in other devices and other environments as well. The method begins in step 201, in which control immediately passes to step 210.

In step 210, switch 140 permits over-subscription in allocation of bandwidth to virtual circuits. As noted in sections above, over-subscription refers to a scenario in which the sum of allocated bandwidths (for virtual circuits) on a path exceeds the line rate of the path. Thus, switch 140 is implemented to accept configuration (manually by an administrator and/or automatically by signaling protocols) of a virtual circuit even if the allocated bandwidth would cause the sum of allocated bandwidths to exceed the line rate of the path.

In step 230, switch 140 receives cells related to various virtual circuits. For illustration, it is assumed that cells related to several VC-types (CBR, VBR RT, VBR nRT and UBR) are received. In case of some devices (e.g., edge routers and CPEs), frames may be received, which in turn are fragmented into cells in a known way. The cells thus generated may be received by appropriate component in the edge router/CPE.

In step 250, switch 140 schedules (shapes) cells while enforcing to ATM specified priorities and limiting bandwidth usage by each virtual circuit to any corresponding allocated bandwidth. As is well known, ATM standards generally specify that cells related to CBR, VBR-RT, VBR-nRT and UBR VC-types (virtual circuit type) be scheduled for transmission in that priority.

In addition, CBR and VBR type virtual circuits are characterized by associated allocated bandwidths (which are specified by the corresponding QoS parameters). Switch 140 forwards the cells for each (CBR/VBR) virtual circuit, while ensuring that the bandwidth usage (by the virtual circuit) does not exceed the allocated bandwidth. The method then ends in step 299.

The description is continued with the manner in which step 250 may be implemented with examples.

4. Cell Scheduling or Traffic Shaping

Figure 3A:
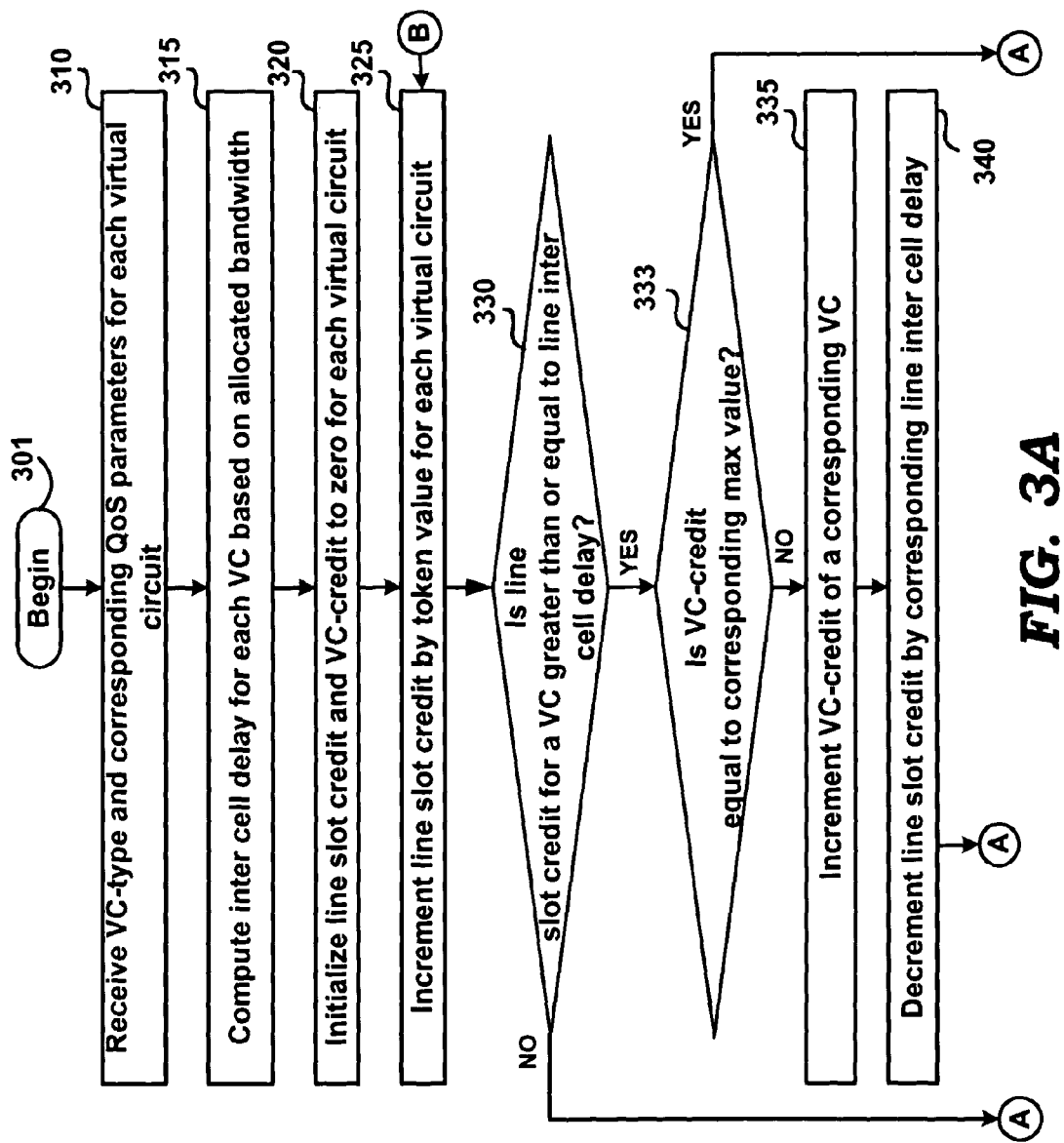
FIGS. 3A and 3B together represent a flow chart illustrating the manner in which cells related to different virtual circuits may be scheduled for transmission according to an aspect of the present invention.
Figure 3B:
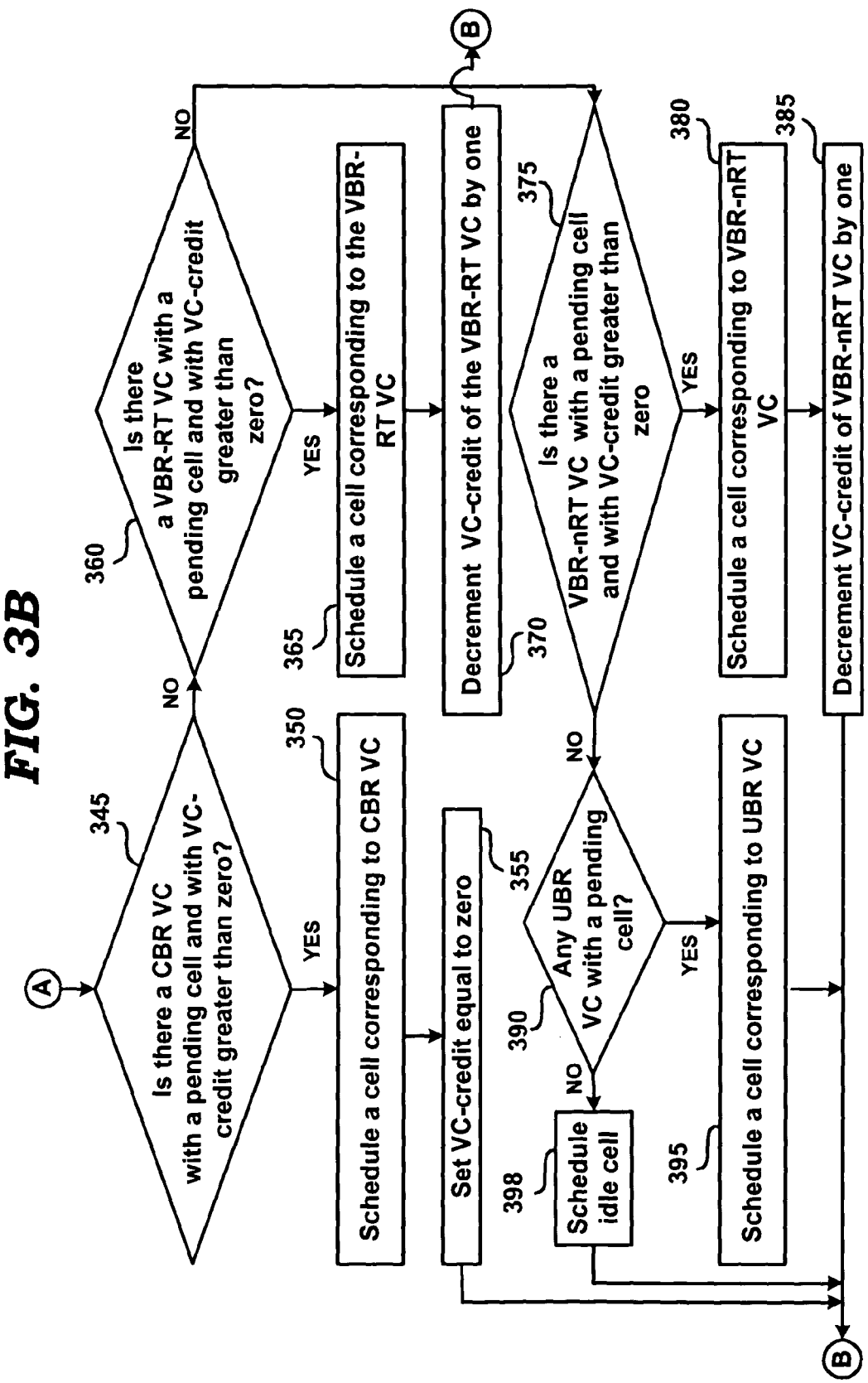

FIGS. 3A and 3B together represent a flow chart illustrating the manner in which transmission of cells may be sequenced to meet the various features noted above with reference to steps 210 and 250. The method is again described with reference to FIG. 1 for illustration. However, the method can be implemented in other environments as well. The method begins in step 301 in which the control immediately passes to step 310.

In step 310, VC-type and corresponding QoS parameters for each virtual circuit are received. As is well known, the QoS parameters depend on the VC-type. For example, CBR VCs are characterized by peek cell rate (PCR); VBR VCs are characterized by PCR, sustained cell rate (SCR), and maximum burst size (MBS); and UBR VCs are optionally characterized by PCR. In general, the QoS parameters are received when the corresponding virtual circuit is provisioned/configured.

In step 315, the inter-cell delay is computed for each of the VCs. Inter-cell delay generally represents the delay between two consecutive cells in the ideal scenario. Thus, in case of virtual circuits with allocated bandwidths (PCR in case of CBR, and SCR in case of VBR), the inter-cell delay is inversely proportional to the corresponding allocated bandwidth. In an embodiment, the inter-cell delay is computed according to the equation: [(line rate×token value)/SCR], wherein 'x' represents multiplication operator, token value is chosen as 100, and '/' represents division operator.

In step 320, counters (line slot credit and VC-credit) are initialized to zero for each virtual circuit. Line slot credit is used to determine whether the corresponding virtual circuit's turn has arrived for transmission of a cell. VC-credit generally represents the additional cells that need to be transmitted for the VC consistent with the allocated bandwidth and the VC-type as described below in further detail.

In step 325, the line slot credit is incremented by a token value for each virtual circuit. In an embodiment, the token value is equated to the duration of a cell slot, and several computations related to time are performed using the token value.

In step 330, a determination is made as to whether the slot credit for a VC is greater than or equal to the inter-cell delay. Control is transferred to step 333 if line slot credit is greater than or equal to inter-cell delay, or else control is transferred to step 345. It may be appreciated that steps 325, 330, 333, 335 and 340 are repeated for each virtual circuit as applicable.

In step 333, a determination is made as to whether the VC-credit of each VC is equal to the corresponding maximum value. In the case of CBR virtual circuits, the maximum value is always equal to 1. In the case of VBR virtual circuits, the maximum value may be computed according to the equation [MBS−(MBS×SCR/PCR)−1], wherein '−' and '×' respectively represent a subtraction and multiplication operation, and MBS, SCR and PCR represent corresponding QoS parameters, as noted above.

Control passes to step 345 if the VC-credit is equal to the corresponding maximum value, and to step 335 otherwise. In step 335, the VC-credit of the corresponding VC is incremented. In step 340, the value of line slot credit is decremented by the corresponding value of inter-cell delay determined in step 315.

It may be appreciated that the steps described above set up various counters, which are used to determine the next cell to be transferred. The remaining steps described below operate to use the counters to determine which cell to transfer in the present cell slot.

In step 345, a determination is made as to whether there is a CBR VC with pending cells and with VC-credit of 1. If there is such a VC, control is transferred to step 350, or else to step 360. In case of more than one VC satisfying such a criteria, one of the VCs may be selected, for example, in a round-robin fashion. In step 350, the next available cell corresponding to CBR VC is scheduled for transmission. In step 355, VC-credit is set equal to '0' and the control is transferred to step 325 to determine the cell for transmission in the next cell slot.

Steps 360 and 365 are performed similar to steps 345 and 350 respectively, but for VBR-RT virtual circuits. In step 370, the VC-credit is decremented by one (since the maximum value can be greater than 1). Control then passes to step 325. Steps 375, 380 and 385 are performed similar to steps 360, 365 and 370 respectively, but for VBR-nrt virtual circuits.

In step 390, switch 140 determines whether there is a UBR VC with any pending cells. If there is such a virtual circuit, the next pending cell on that virtual circuit is scheduled for transmission assuming a PCR not specified associated with the UBR VC. The manner in which PCR parameters may be handled for all applicable type of virtual circuits is described in sections below.

In step 398, if the UBR VC has no pending cells, an idle cell may be scheduled for transmission in the corresponding cell slot to maintain synchronization. Control is then transferred to step 325. Steps 325 through 385 may be implemented for each cell slot to determine the next cell for transmission.

It should be appreciated that the processing is performed for CBR, VBR-RT, VBR-nRT, and UBR in that sequence, thereby implementing the priority specified by the ATM standard. The description is continued with reference to some examples for illustrating the approaches described above.

5. Allocating Slots to Virtual Circuits

FIG. 4A is a table illustrating allocation of cell slots when a single VC is provisioned in a non-over-subscription scenario. The table is shown containing columns 401-408 for the corresponding eight cell slots, and rows 441-446 respectively representing line slot credit, cell slot, line slot balance, cell spacing, transmitted cell, and VC credit. Each row and column are described below in further detail.

The contents of the table are designed assuming a line rate of 640 Kbps and a single (idle, i.e., no cells available for transmission) VBR-nRT VC having QoS parameters of (PCR=448 Kbps, SCR=320 Kbps, MBS=14 cells). The line inter-cell delay of the VC may be computed to equal [(640*100)/320=200 units], wherein 100 represents the chosen token value. The maximum burst VC credit for the PVC may be computed according to the formula: [MBS−(MBS×SCR/PCR)−1], as noted above. Thus, the maximum burst VC credit for the VC equals (14−(14×320/448)−1)=3.

With respect to the columns, each column represents the relevant values in a corresponding of the cell slots 401 through 408. Line slot credit 441 represents a present total credit value for a virtual circuit, and is generated by incrementing the entry in line slot balance 443 for the previous cell slot (as in step 325). Thus, the values (200, 100, 200, 100, 200, 100, 200) in columns 402-408 of line slot credit 441 are respectively generated by adding 100 (token value) to the values (100, 0, 100, 0, 100, 0, 100, 0) in columns 401-407 of line slot balance 443.

VC credit 446 is incremented by 1 (as in step 335) if the corresponding line slot credit is greater than or equal to the inter-cell delay (columns 402, 404 and 406) unless the VC credit value already equals the maximum permissible value (column 408). VC credit 446 is decremented by 1 when a cell is transmitted on the corresponding VC in a previous cell slot (as illustrated below with reference to FIGS. 4B and 4C). As the VC in the subject example is assumed to be idle, no instances of decrementing are shown.

In general, the next pending cell on a virtual circuit is considered ready for transmission if the VC credit for the virtual circuit is greater than or equal to one. In addition, VC credit generally represents the backlog (for each virtual circuit) computed according to allocated bandwidth, but the upper limit is determined by the VC-type.

The entries for line slot balance 443 are generated by deducting the inter-cell delay from line slot credit 441 in the same column when VC credit is incremented by one (as in step 335), otherwise the line slot balance equals the line slot credit of the same column. Thus, when VC credit is shown incremented in cell slots 402, 404, 406 and 408, the corresponding entries of line slot balance 443 are shown equaling 0 (200 in line slot credit row less the inter-cell delay of 200). In the remaining columns (401, 403, 405 and 407), the line slot balance is shown equaling the line slot credit value.

Cell slot 442 indicates the cell slots in which the cells for a virtual circuit would need to be transmitted according to the allocated bandwidth without consideration of other criteria (such as priorities, etc.). As the allocated bandwidth (SCR) equals half the line rate, alternate entries are marked with VC1. Cell spacing 444 indicates the virtual circuits that would be candidates for allocation of the cell slot according to the allocated bandwidth. Since a single VC is considered in FIG. 4A, the values in this row equals the values in cell slot 442.

Transmitted cell 445 indicates the virtual circuit which is allocated the corresponding cell slot. As the VC is assumed to be idle, all entries are marked idle (i.e., idle cell is scheduled for transmission). However, after cell slot 408, three of the cells received on the VC would be permitted to be transmitted at the corresponding PCR rate (allocated bandwidth in case of CBR VC) as the VC credit equals 3 in cell slot 408.

Thus, it may be appreciated that the approach described above implements the ATM specifications when a communication path is not over-subscribed. The description is continued with respect to an example in the over-subscribed scenario. For understanding, FIG. 4B illustrates the manner in which scheduling is performed while enforcing ATM-specified priorities and allocated bandwidths. FIG. 4C illustrates the manner in which the approach can be extended to enforce PCR specified limits on VBR/UBR type virtual circuits.

FIG. 4B contains a table illustrating the scheduling of cells in a over-subscription scenario. The table contains data related to times slots 451-460. The table is designed assuming a scenario in which the line rate equals 640 Kbps, and that a CBR VC (with PCR=512 Kbps) and a VBR-nRT VC (with PCR, SCR and MBS respectively equaling 448 Kbps, 320 Kbps, 14) share the same path. As may be appreciated, this represents a over-subscribed scenario in which the total allocated bandwidth (512+320) exceeds the line-rate.

Continuing with the description, assuming a token value of 100, inter-cell delay for the CBR VC is computed by [(640*100)/512=125], and the inter-cell delay for the VBR-nRT VC is computed by [(640*100)/320=200]. Rows 461-463 and 469-A relate to CBR VC, and rows 464-466 and 469-B relate to VBR-nRT VC. The rows with similar labels as in FIG. 4A are used similarly.

Cell slot 462 indicates that the CBR VC would be a candidate for allocation of cell slots 452-455 and 457-460 based on the entries in line slot credit 461 and line slot balance 463. Similarly, cell slot 465 indicates the VBR-nRT VC would be a candidate for allocation of cell slots 452, 454, 456, 458 and 460.

Thus, in cell spacing 467 row, an idle cell is shown to be candidate for scheduling in cell slot 451 (cells of neither VC transmitted), the CBR VC is indicated to be exclusive candidate for transmission in cell slots 453, 455, 457, and 459, the VBR-nRT VC is indicated to be exclusive candidate for scheduling in cell slot 456, and both VCs are indicated to be candidates in cell slots 452, 454, 458 and 460.

In case a VC is indicated as exclusive candidate for transmission in a cell slot and if there is a pending cell on the virtual circuit, a cell of that VC is scheduled for transmission, as depicted in cell slots 453 and 456 of transmitted cell 468 row. However, when multiple VCs are candidates for transmission, the CBR VC is provided higher priority (compared to VBR nRT) as depicted in cell slots 452 and 454. In cell slots 455, 457 and 458, a cell related to VBR nRT is shown transmitted because it is assumed that a cell for the CBR VC is not pending in that cell slot (and there is a pending cell on VBR nRT VC).

An idle cell is shown scheduled for transmission in cell slot 459 assuming that no new cells are received for CBR VC (even if there is a pending cell on VBR nRT VC since the corresponding VC credit 469-B equals zero). Assuming that additional CBR cells are not received again (or pending), a pending cell of VBR nRT is shown transmitted in cell slot 460 (even though CBR VC also is a candidate).

Each value in VC-credit rows 469-A and 469-B is incremented by 1 if the corresponding line slot credit is equal to or greater than the line intercell delay, and decremented by 1 if a cell for the virtual circuit is scheduled for transmission in the same cell slot, while ensuring that the VC-credit does not exceed any corresponding maximum value. The incrementing and decrementing are illustrated below with reference to the entries in VC-credit row 469-B for VBR nRT virtual circuit.

The first cell slot 451 of VC credit row 469-B is shown starting with a 0, and the entries thereafter are shown with a convention A+B−C=D, wherein A represents a value from a previous cell slot of the same row, B represents 1 if the line slot credit in the same cell slot (column) is greater than or equal to the line intercell delay (otherwise 0), C represents 1 if a cell is scheduled for transmission in the present cell slot, D represents the results of addition and subtraction (and would equal the value of A for the next cell slot), and '+' and '−' respectively represent the symbols for addition and subtraction.

It may be appreciated that the above described approach provides several features. For example, over-subscription is supported because the two VCs of FIG. 4B can co-exist and operate to transfer respective cells. Prioritization may be implemented across several VC types (e.g., in cell slots 452 and 454, CBR VC is given higher priority compared to VBR nRT VC). The approach limits the bandwidth usage according to the allocated bandwidth (e.g., cells related to VBR nRT are not transmitted in cell slot 459 even if pending).

Thus, it may be appreciated that the approach(es) of above enable an ATM device to support over-subscription while enforcing ATM specified priorities and also limiting bandwidth usage by each virtual circuit to a corresponding allocated bandwidth. In addition, the approach(es) may need to limit the bandwidth usage by each virtual circuit (e.g., UBR and VBR types) to any corresponding PCR (peak cell rate) limits. The manner in which the approaches of above be extended to support PCR imposed constraints is described below.

6. Enforcing PCR Cell Rate

The extensions/modifications that may be performed to the flow-charts of FIGS. 3A and 3B to enforce peak cell rate (PCR) on each virtual circuit are described first. The description is then continued with reference to FIG. 4C, which illustrates how the PCR enforcement may change allocation of cell slots in relation to the scenario of FIG. 4B described above.

With respect to the extensions/modifications, in addition to "intercell delay" of step 320, a "peak intercell delay" may be computed associated with each of VBR and UBR virtual circuits having an associated PCR. The peak intercell delay may be computed according to the equation [peak intercell delay=(line rate×token value)/PCR], wherein the same value (100) used with respect to computations above can be used for token value.

With respect to the initializations of step 320, a variable "peak slot credit" may be maintained for each virtual circuit and initialized to 0. Another variable "peak maximum slot credit" may be computed according to the equation [token value×(1+floor((peak intercell delay−1)/100))]. With respect to the incrementing of step 325, peak slot credit is also incremented by token value in the same step, but is capped at peak maximum slot credit.

With respect to scheduling for transmission, in addition to the respective comparisons/conditions of steps of 360, 375 and 390, an additional check may be performed to determine whether peak slot credit is greater than or equal to peak intercell delay. The cell for a virtual circuit is scheduled for transmission only if the additional check returns a positive result.

Once a cell related to a virtual circuit is scheduled for transmission, the peak slot credit counter for the virtual circuit is decremented by the corresponding peak intercell delay. The modifications of above operate to enforce PCR on associated virtual circuits as illustrated below in further detail with reference to FIG. 4C.

FIG. 4C is a table illustrating the scheduling of cells when PCR is also enforced as described above. For illustration, it is again assumed that the line rate equals 640, a first virtual circuit (VC1) is of CBR type with an allocated bandwidth of 512, a second virtual circuit (VC2) is of VBR-nRT type with PCR, SCR and MBS respectively equaling 448 Kbps, 320 Kbps, 14. Again, the sum of the allocated bandwidths exceeds the line rate, i.e., (512+320>640).

The line intercell delays of the two circuits respectively equal 125 and 200 as noted above. The peak intercell delay and peak maximum slot credit for the VBR virtual circuit are respectively computed by the below equations.

peak intercell delay=(640*100)/448=142;

peak maximum slot credit=100*(1+floor[(142-1)/ 100])=200

Continuing with reference to FIG. 4C, columns 471-480 represent the status of various counters in the corresponding cell slots. Rows 481-491 represent the status of various counters (some of them shown merely for understandability) in the corresponding cell slots. Rows 481-487 operate similar to rows 461-467 of FIG. 4B, and the differences are described briefly below. The remaining rows 488-491 are also briefly described below.

Peak slot credit 488 is generated by adding token value (100) to the value in previous cell slot of peak slot balance 490 (shown in columns 472, 476-480), but the maximum value is capped at peak maximum slot credit (shown in columns 473-475 and 478). In addition, a cell for the VBR-nRT is scheduled for transmission only if peak slot credit 488 is greater than or equal to peak intercell delay (142).

Thus, transmitted cell row 489 is depicted as scheduling an idle cell in cell slots 477 and 480 even if a pending cell is present for VBR-nRT since the peak slot credit 488 is less than peak intercell delay (and represents a difference from the operation depicted in FIG. 4B, cell slots 457, 459 and 460). However, the pending cell is shown transmitted in the immediate cell slot 478 as peak slot credit 488 is shown with a value of 200 (more than peak intercell delay of 142).

Each entry of peak slot balance 490 equals the value in peak slot credit 488 of the same cell slot if a VBR nRT cell is not transmitted (shown in cell slots 471-474, 477, and 480), or else equals peak intercell delay (142) less the value in peak slot credit 488 (shown in cell slots 475, 476, 478 and 479).

VC credit counter 491 (for VBR nRT) operates similar to VC credit counter 469-B, and the same convention of (A+B−C=D, described above) is used to represent each entry after the first cell slot. The differences in values are briefly described now. It may first be noted that an idle cell is transmitted (instead of a cell of the VBR nRT virtual circuit) in cell slots 477 and 480 (because peak slot credit is less than peak intercell delay). As a result, the entry in cell slot 477 and 479 is not decremented and thus remains at a value of 1 (compared to a value of 0 in row 469-B of FIG. 4B).

Thus, it may be appreciated that the credits based approach can be extended to enforce PCR constraints as well. The description is continued with reference to the manner in which example ATM devices may be implemented according to various aspects of the present invention.

7. ATM Device

Figure 5:
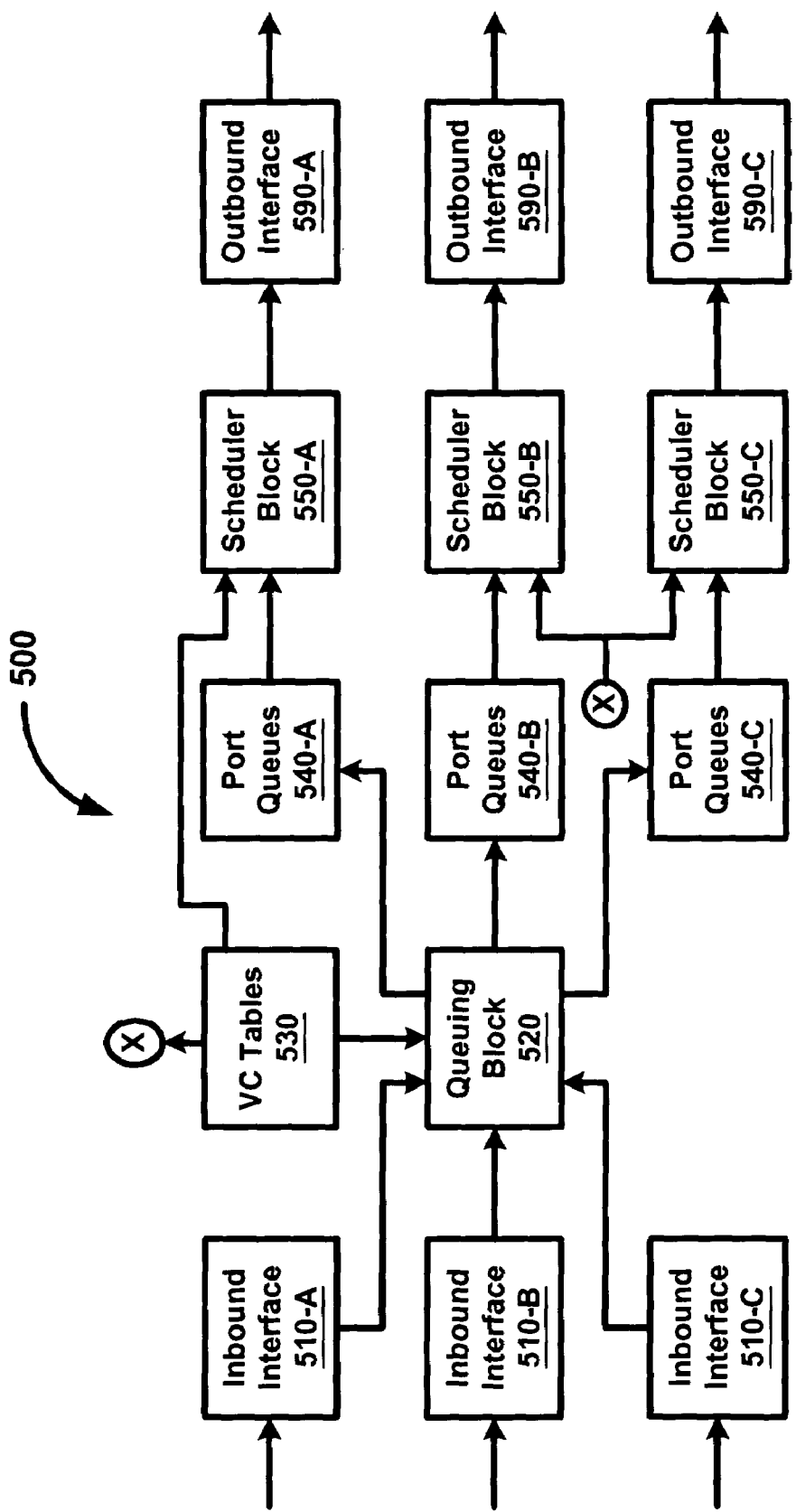
FIG. 5 is a block diagram illustrating the details of an embodiment of an ATM device provided according to an aspect of the present invention.

FIG. 5 is a block diagram illustrating the ATM devices may be implemented according to various aspects of the present invention. ATM device 500 is shown containing inbound interfaces 510-A, 510-B, and 510-C, queuing block 520, VC tables 530, port queues 540-A, 540-B, and 540-C, scheduler blocks 550-A, 550-B, and 550-C and outbound interfaces 590-A, 590-B, and 590-C. Each block is described below in further detail.

Each of the inbound interfaces 510-A, 510-B, and 510-C provides physical, electrical and protocol interface to receive ATM cells on a corresponding path. The received cells may be forwarded to queuing block 520. Similarly, outbound interface 590-A, 590-B, and 590-C provides physical, electrical and protocol interface to transmit ATM cells on a corresponding path. Both interfaces may be implemented in a known way.

VC tables 530 may contain various pieces of information required to process each received cell. For example, one table may specify a mapping of {inbound VPI/VCI and inbound interface} to {outbound VPI/VCI and outbound interface}. Similarly, the VC-type and corresponding QoS parameters for each active VC may also be contained in VC tables. In general, the QoS parameters are stored when a configuration for a virtual circuit is accepted. VC tables may be populated manually by the administrator of an ATM device (switch 140) or by appropriate signaling protocols.

Queuing block 520 places each received cell on a corresponding VC-queue in one of port queues 540-A through 540-C. To implement such a task, the inbound VPI/VCI and the specific port/interface on which the cell is received is mapped to the corresponding outbound VPI/VCI and the specific one of the port queues by accessing VC tables 530.

The outbound VPI/VCI may replace the inbound VPI/VCI in each cell, and the resulting cell is placed on the determined one of the port queues. While queuing block 530 is shown shared by all the inbound interfaces, potentially a dedicated queuing block may be implemented with each inbound interface. On the other hand, a single scheduler block may be shared for all the outbound interfaces.

Each of the port queues 540-A, 540-B, and 540-C may contain a queue corresponding to each VC supported on the corresponding outbound interface. The queues may be implemented using data structures such as linked lists and using appropriate memory units.

Each of scheduler blocks 550-A, 550-B, and 550-C determine the specific one of the pending cells (on all VCs) on the corresponding one of port queues 540-A, 540-B, and 540-C. The approach(es) described above may be used to make such a determination for each port queue. The determined cells are transmitted by the outbound interfaces.

Thus, an ATM device according to FIG. 5 may support virtual circuits according to various aspects of the present invention. While ATM device 500 may correspond to an ATM switch, the implementation of the above-described features in CPEs and edge routers will be apparent to one skilled in the relevant arts by reading the disclosure provided herein.

It should be understood that each of the blocks of FIG. 5 can be implemented in a combination of one or more of hardware, software and firmware. When cost is of primary consideration, the implementation is performed more in software (e.g., using a processor executing instructions provided in software/firmware). Cost and performance can be balanced by implementing ATM devices with a desired mix of hardware, software and/or firmware. An embodiment implemented substantially in software is described below.

8. Software Implementation

Figure 6:
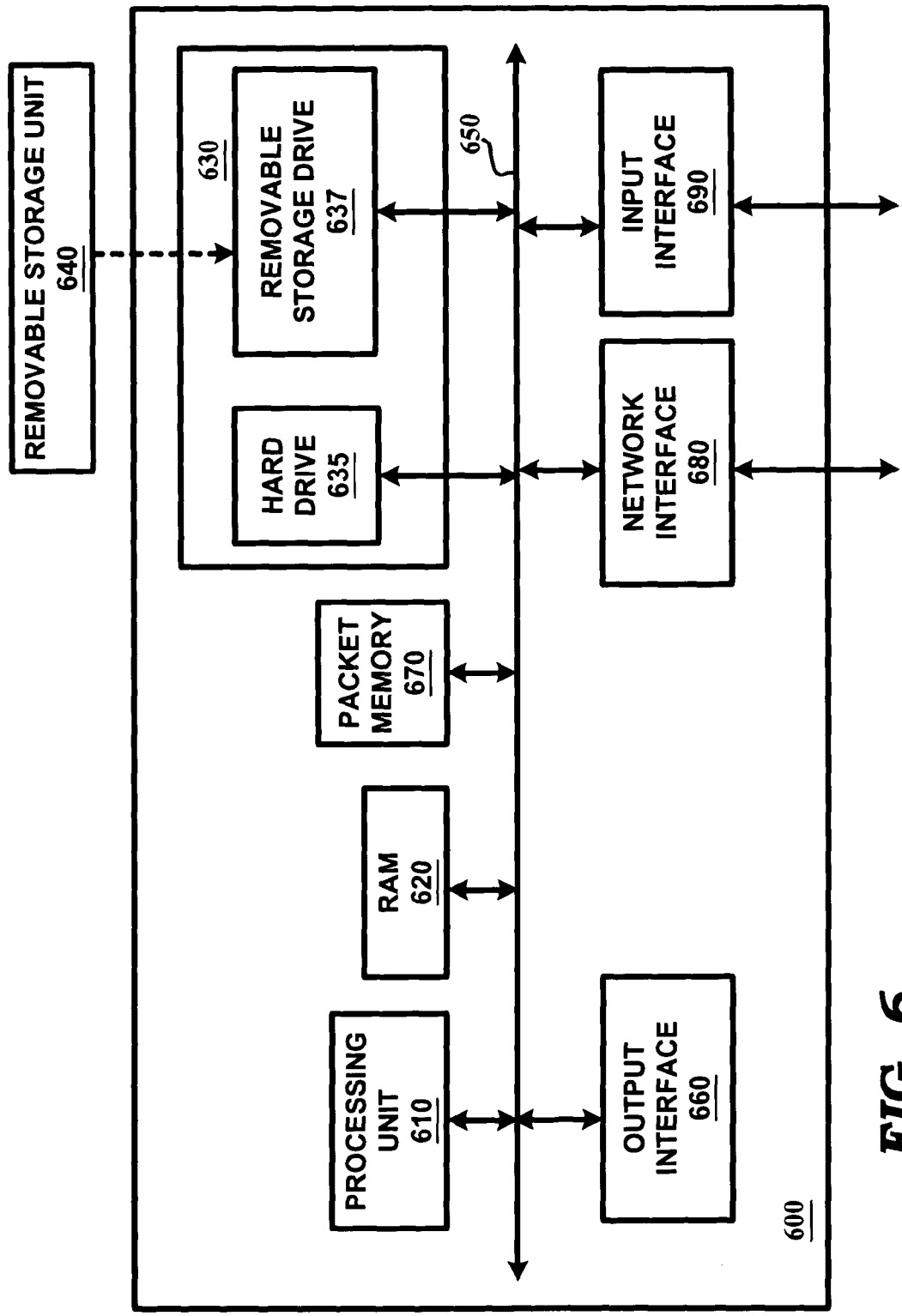
FIG. 6 is a block diagram illustrating the details of an embodiment of an ATM device implemented substantially in the form of software according to an aspect of the present invention.

FIG. 6 is a block diagram illustrating the details of ATM device 600 in one embodiment of the present invention. ATM device 600 is shown containing processing unit 610, random access memory (RAM) 620, storage 630, output interface 660, packet memory 670, network interface 680 and input interface 690. Each component is described in further detail below.

Output interface 660 provides output signals (e.g., display signals to a display unit, not shown) which can form the basis for a suitable user interface for an administrator (configuring ATM device 600) to interact with ATM device 600. Input interface 690 (e.g., interface with a key-board and/or mouse, not shown) enables an administrator to provide any necessary inputs.

Network interface 680 enables ATM device 600 to send and receive data on communication networks using asynchronous transfer mode (ATM) and/or internet protocol (IP). Network interface 680, output interface 660 and input interface 690 can be implemented in a known way.

RAM 620 receives instructions on path 650 from storage 630, and provides the instructions to processing unit 610 for execution. Packet memory 670 stores (queues) cells/packets waiting to be forwarded (or otherwise processed) on different ports. RAM 620 may be used to store the various VC tables as well. RAM 620 and packet memory 670 may each be implemented as multiple units of memory and/or share the same memory unit(s).

Secondary memory 630 may contain units such as hard drive 635 and removable storage drive 637. Secondary storage 630 may store the software instructions and data, which enable ATM device 600 to provide several features in accordance with the present invention. In an embodiment, VC tables 530 may be implemented using RAM 620, storage 630 and secondary memory 630.

Some or all of the data and instructions may be provided on removable storage unit 640, and the data and instructions may be read and provided by removable storage drive 637 to processing unit 610. Floppy drive, magnetic tape drive, CD-ROM drive, DVD Drive, Flash memory, removable memory chip (PCMCIA Card, EPROM) are examples of such removable storage drive 637.

Processing unit 610 may contain one or more processors. Some of the processors can be general purpose processors which execute instructions provided from RAM 620. Some can be special purpose processors adapted for specific tasks (e.g., for memory/queue management). The special purpose processors may also be provided instructions from RAM 620. In general, processing unit 610 reads sequences of instructions from various types of memory medium (including RAM 620, storage 630 and removable storage unit 640), and executes the instructions to provide various features of the present invention.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of determining the specific cell to transmit in each of a sequence of successive slots on a communication path coupled to an ATM switch, said method being performed in said ATM switch, said method comprising:

receiving a plurality of sequences of cells, each sequence of cells being received on a corresponding one of a plurality of virtual circuits (VCs), each virtual circuit having an associated allocated bandwidth;

initializing a VC-credit counter and a line slot credit counter associated with each of said plurality of virtual circuits including a fourth virtual circuit to zero;

computing an inter-cell delay associated with each of said plurality of virtual circuits including said fourth virtual circuit, wherein the inter-cell delay is computed to have a negative correlation to the magnitude of the corresponding allocated bandwidth;

incrementing said line slot credit counter by a token value in each cell slot of said communication path, wherein said token value is determined by a length of duration of cell slots on said communication path;

incrementing said VC-credit counter of each virtual circuit by one if said line slot credit counter of the corresponding virtual circuit is equal to or greater than said inter-cell delay and if said VC-credit counter is already not equal to a maximum number specified by corresponding virtual circuit;

scheduling a cell of said fourth virtual circuit for transmission in a slot only if said VC credit counter is greater than or equal to 1 for that slot;

decrementing said line slot credit counter by said inter-cell delay when said VC-credit counter is incremented; and decrementing said VC-credit counter by one when a cell related to said fourth virtual circuit is scheduled for transmission.

2. The method of claim 1, further comprising:

computing a peak maximum slot credit and a peak intercell delay associated with said fourth virtual circuit if said fourth virtual circuit is of a type having a peak cell rate (PCR) in addition to allocated bandwidth, wherein said peak intercell delay and said peak maximum slot credit are computed to have a negative correlation with a magnitude of said PCR;

initializing a peak slot credit associated with said fourth virtual circuit to zero;

incrementing said peak slot credit by said token value in each cell slot, but said peak slot credit being capped at said peak maximum slot credit;

decrementing said peak slot credit by said peak intercell delay if a cell associated with said fourth virtual circuit is scheduled for transmission; and scheduling for transmission a cell on said fourth virtual circuit only if said peak slot credit is greater than or equal to said peak intercell delay.

3. The method of claim 2, wherein said maximum number equals 1 if said fourth virtual circuit is of CBR VC-type and greater than 1 in case of VBR-type.

4. The method of claim 3, wherein said communication path has a line bandwidth, said line bandwidth equaling a line rate, wherein said plurality of virtual circuits comprise a plurality of VC-types, said method further comprising:

accepting a configuration of said plurality of virtual circuits, wherein a sum of allocated bandwidths of said plurality of virtual circuits exceeds said line rate;

scheduling for transmission said plurality of cells on said communication path while enforcing a pre-specified priority with respect to said plurality of VC-types and while limiting bandwidth usage by each of said plurality of virtual circuits to a corresponding allocated bandwidth.

5. The method of claim 4, wherein said plurality of VC-types comprise constant bit rate (CBR) VC-type, variable bit rate-real time (VBR-RT) VC-type, variable bit rate—non real time (VBR-nRT) VC-type, wherein said pre-specified priority comprises highest to lowest priority for CBR VC-type, VBR-RT VC-type and VBR-nRT VC-type in that order, wherein a first cell related to a lower priority VC-type is scheduled for transmission only if no cells of a higher priority VC-type are ready for transmission.

6. The method of claim 5, wherein said plurality of VC-types further comprises unspecified bit rate (UBR) VC-type, wherein UBR VC-type is given lower priority than said VBR-nRT VC-type.

7. The method of claim 5, wherein said scheduling comprises:
  determining cell slots in which of each of said plurality of virtual circuits is a candidate for allocation according to a corresponding allocated bandwidth, wherein a first virtual circuit of a first VC-type and a second virtual circuit of a second VC-type are determined to be candidates for allocation in a first cell slot on said communication path, wherein said first VC-type is different from said second VC-type; and
  allocating said first cell slot to one of said first virtual circuit and said second virtual circuit having a higher priority if the virtual circuit with the higher priority has a cell ready for transmission.

8. The method of claim 7, wherein said scheduling further comprises allocating said first cell slot to one of said first virtual circuit and said second virtual circuit having a lower priority if the virtual circuit with the higher priority does not have a cell ready for transmission and if the virtual circuit with the lower priority has a cell ready for transmission.

9. The method of claim 2, wherein said fourth virtual circuit is of VBR VC-type, and wherein said maximum number is computed according to the equation [MBS−(MBS×SCR/PCR)−1], wherein − and × respectively represent a subtraction and a multiplication operation, PCR represents peak cell rate, SCR represents sustained cell rate, and MBS represents maximum burst size of said fourth virtual circuit.

10. The method of claim 2, wherein said ATM device comprises one of a CPE, an ATM switch and a edge router.

11. The method of claim 1, wherein said VC-credit counter for said fourth virtual circuit is incremented if said VC credit counter is greater than or equal to 1 for that slot even when at least one of a first condition and a second condition is true, wherein said first situation is in which a cell is not available on said fourth virtual circuit for transmission and said second situation is in which a cell on said fourth virtual circuit is available for transmission but not scheduled for transmission because a cell corresponding to some other eligible virtual circuit is transmitted.

12. A machine readable medium carrying one or more sequences of instructions for causing an ATM device to determine the specific cell to transmit in each of a sequence of successive slots on a communication path coupled to said ATM switch, wherein execution of said one or more sequences of instructions by one or more processors contained in said ATM device causes said one or more processors to perform the actions of:
  receiving a plurality of sequences of cells, each sequence of cells being received on a corresponding one of a plurality of virtual circuits (VCs), each virtual circuit having an associated allocated bandwidth;
  initializing a VC-credit counter and a line slot credit counter associated with each of said plurality of virtual circuits including a fourth virtual circuit to zero;
  computing an inter-cell delay associated with each of said plurality of virtual circuits including said fourth virtual circuit, wherein the inter-cell delay is computed to have a negative correlation to the magnitude of the corresponding allocated bandwidth;
  incrementing said line slot credit counter by a token value in each cell slot of said communication path, wherein said token value is determined by a length of duration of cell slots on said communication path;
  incrementing said VC-credit counter of each virtual circuit by one if said line slot credit counter of the corresponding virtual circuit is equal to or greater than said inter-cell delay and if said VC-credit counter is already not equal to a maximum number specified by corresponding virtual circuit;
  scheduling a cell of said fourth virtual circuit for transmission in a slot only if said VC credit counter is greater than or equal to 1 for that slot;
  decrementing said line slot credit counter by said inter-cell delay when said VC-credit counter is incremented; and
  decrementing said VC-credit counter by one when a cell related to said fourth virtual circuit is scheduled for transmission.

13. The machine readable medium of claim 12, further comprising:
  computing a peak maximum slot credit and a peak intercell delay associated with said fourth virtual circuit if said fourth virtual circuit is of a type having a peak cell rate (PCR) in addition to allocated bandwidth, wherein said peak intercell delay and said peak maximum slot credit are computed to have a negative correlation with a magnitude of said PCR;
  initializing a peak slot credit associated with said fourth virtual circuit to zero;
  incrementing said peak slot credit by said token value in each cell slot, but said peak slot credit being capped at said peak maximum slot credit;
  decrementing said peak slot credit by said peak intercell delay if a cell associated with said fourth virtual circuit is scheduled for transmission; and
  scheduling for transmission a cell on said fifth virtual circuit only if said peak slot credit is greater than or equal to said peak intercell delay.

14. The machine readable medium of claim 13, wherein said maximum number equals 1 if said fourth virtual circuit is of CBR VC-type and greater than 1 in case of VBR-type.

15. The machine readable medium of claim 13, wherein said fourth virtual circuit is of VBR VC-type, and wherein said maximum number is computed according to the equation [MBS−(MBS×SCR/PCR)−1], wherein − and × respectively represent a subtraction and a multiplication operation, PCR represents peak cell rate, SCR represents sustained cell rate, and MBS represents maximum burst size of said fourth virtual circuit.

16. The machine readable medium of claim 13, wherein said ATM device comprises one of a CPE, an ATM switch and a edge router.

17. The machine readable medium of claim 12, wherein said communication path has a line bandwidth, said line bandwidth equaling a line rate, wherein said plurality of virtual circuits comprise a plurality of VC-types further comprising:
  accepting a configuration of said plurality of virtual circuits, wherein a sum of allocated bandwidths of said plurality of virtual circuits exceeds said line rate; and
  scheduling for transmission said plurality of cells on said communication path while enforcing a pre-specified priority with respect to said plurality of VC-types and while limiting bandwidth usage by each of said plurality of virtual circuits to a corresponding allocated bandwidth.

18. The machine readable medium of claim 17, wherein said plurality of VC-types comprise constant bit rate (CBR) VC-type, variable bit rate-real time (VBR-RT) VC-type, variable bit rate—non real time (VBR-nRT) VC-type, wherein said pre-specified priority comprises highest to lowest priority for CBR VC-type, VBR-RT VC-type and VBR-nRT VC-type in that order, wherein a first cell related to a lower priority VC-type is scheduled for transmission only if no cells of a higher priority VC-type are ready for transmission.

19. The machine readable medium of claim 18, wherein said plurality of VC-types further comprises unspecified bit rate (UBR) VC-type, wherein UBR VC-type is given lower priority than said VBR-nRT VC-type.

20. The machine readable medium of claim 18, wherein said scheduling comprises:
   determining cell slots in which of each of said plurality of virtual circuits is a candidate for allocation according to a corresponding allocated bandwidth, wherein a first virtual circuit of a first VC-type and a second virtual circuit of a second VC-type are determined to be candidates for allocation in a first cell slot on said communication path, wherein said first VC-type is different from said second VC-type; and
   allocating said first cell slot to one of said first virtual circuit and said second virtual circuit having a higher priority if the virtual circuit with the higher priority has a cell ready for transmission.

21. The machine readable medium of claim 20, wherein said scheduling further comprises allocating said first cell slot to one of said first virtual circuit and said second virtual circuit having a lower priority if the virtual circuit with the higher priority does not have a cell ready for transmission and if the virtual circuit with the lower priority has a cell ready for transmission.

22. The computer readable medium of claim 17, wherein said VC-credit counter for said fourth virtual circuit is incremented if said VC credit counter is greater than or equal to 1 for that slot even when at least one of a first condition and a second condition is true, wherein said first situation is in which a cell is not available on said fourth virtual circuit for transmission and said second situation is in which a cell on said fourth virtual circuit is available for transmission but not scheduled for transmission because a cell corresponding to some other eligible virtual circuit is transmitted.

23. An ATM device to transmit cells in a sequence of successive slots on a communication path, said ATM device comprising:
   means for receiving a plurality of sequences of cells, each sequence of cells being received on a corresponding one of a plurality of virtual circuits (VCs), each virtual circuit having an associated allocated bandwidth;
   means for initializing a VC-credit counter and a line slot credit counter associated with each of said plurality of virtual circuits including a fourth virtual circuit to zero;
   means of computing an inter-cell delay associated with each of said plurality of virtual circuits including said fourth virtual circuit, wherein the inter-cell delay is computed to have a negative correlation to the magnitude of the corresponding allocated bandwidth;
   means for incrementing said line slot credit counter by a token value in each cell slot of said communication path, wherein said token value is determined by a length of duration of cell slots on said communication path;
   means for incrementing said VC-credit counter of each virtual circuit by one if said line slot credit counter of the corresponding virtual circuit is equal to or greater than said inter-cell delay and if said VC-credit counter is already not equal to a maximum number specified by corresponding virtual circuit;
   means for scheduling a cell of said fourth virtual circuit for transmission in a slot only if said VC credit counter is greater than or equal to 1 for that slot;
   means for decrementing said line slot credit counter by said inter-cell delay when said VC-credit counter is incremented; and
   means for decrementing said VC-credit counter by one when a cell related to said fourth virtual circuit is scheduled for transmission.

24. The ATM device of claim 23, further comprising:
   means for computing a peak maximum slot credit and a peak intercell delay associated with said fourth virtual circuit if said fourth virtual circuit is of a type having a peak cell rate (PCR) in addition to allocated bandwidth, wherein said peak intercell delay and said peak maximum slot credit are computed to have a negative correlation with a magnitude of said PCR;
   means for initializing a peak slot credit associated with said fourth virtual circuit to zero;
   means for incrementing said peak slot credit by said token value in each cell slot, but said peak slot credit being capped at said peak maximum slot credit;
   means for decrementing said peak slot credit by said peak intercell delay if a cell associated with said fourth virtual circuit is scheduled for transmission; and
   means for scheduling for transmission a cell on said fourth virtual circuit only if said peak slot credit is greater than or equal to said peak intercell delay.

25. The ATM device of claim 24, wherein said maximum number equals 1 if said fourth virtual circuit is of CBR VC-type and greater than 1 in case of VBR-type.

26. The ATM device of claim 24, wherein said fourth virtual circuit is of VBR VC-type, and wherein said maximum number is computed according to the equation [MBS−(MBS×SCR/PCR)−1], wherein − and × respectively represent a subtraction and a multiplication operation, PCR represents peak cell rate, SCR represents sustained cell rate, and MBS represents maximum burst size of said fourth virtual circuit.

27. The ATM device of claim 24, wherein said ATM device comprises one of a CPE, a DSLAM, an ATM switch and a edge router.

28. The ATM device of claim 23, wherein said communication path has a line bandwidth, said line bandwidth equaling a line rate, wherein said plurality of virtual circuits comprise a plurality of VC-types, said ATM device further comprising:
   means for accepting a configuration of said plurality of virtual circuits, wherein a sum of allocated bandwidths of said plurality of virtual circuits exceeds said line rate; and
   means for scheduling for transmission said plurality of cells on said communication path while enforcing a pre-specified priority with respect to said plurality of VC-types and while limiting bandwidth usage by each of said plurality of virtual circuits to a corresponding allocated bandwidth.

29. The ATM device of claim 28, wherein said plurality of VC-types comprise constant bit rate (CBR) VC-type, variable bit rate-real time (VBR-RT) VC-type, variable bit rate—non real time (VBR-nRT) VC-type, wherein said pre-specified priority comprises highest to lowest priority for CBR VC-type, VBR-RT VC-type and VBR-nRT VC-type in that order, wherein a first cell related to a lower priority VC-type is scheduled for transmission only if no cells of a higher priority VC-type are ready for transmission.

30. The ATM device of claim 29, wherein said plurality of VC-types further comprises unspecified bit rate (UBR) VC-type, wherein UBR VC-type is given lower priority than said VBR-nRT VC-type.

31. The ATM device of claim 29, wherein said means for scheduling is operable to:
  determine cell slots in which of each of said plurality of virtual circuits is a candidate for allocation according to a corresponding allocated bandwidth, wherein a first virtual circuit of a first VC-type and a second virtual circuit of a second VC-type are determined to be candidates for allocation in a first cell slot on said communication path, wherein said first VC-type is different from said second VC-type; and
  allocate said first cell slot to one of said first virtual circuit and said second virtual circuit having a higher priority if the virtual circuit with the higher priority has a cell ready for transmission.

32. The ATM device of claim 31, wherein said means for scheduling is further operable to allocate said first cell slot to one of said first virtual circuit and said second virtual circuit having a lower priority if the virtual circuit with the higher priority does not have a cell ready for transmission and if the virtual circuit with the lower priority has a cell ready for transmission.

33. The ATM device of claim 23, wherein said VC-credit counter for said fourth virtual circuit is incremented if said VC credit counter is greater than or equal to 1 for that slot even when at least one of a first condition and a second condition is true, wherein said first situation is in which a cell is not available on said fourth virtual circuit for transmission and said second situation is in which a cell on said fourth virtual circuit is available for transmission but not scheduled for transmission because a cell corresponding to some other eligible virtual circuit is transmitted.

34. An ATM device to transmit cells in a sequence of successive slots on a communication path, said ATM device comprising:
  an input interface to receive a plurality of sequences of cells, each sequence of cells being received on a corresponding one of a plurality of virtual circuits (VCs), each virtual circuit having an associated allocated bandwidth; and
  a scheduler block operable to:
    initialize a VC-credit counter and a line slot credit counter associated with each of said plurality of virtual circuits including a fourth virtual circuit to zero;
    compute an inter-cell delay associated with each of said plurality of virtual circuits including said fourth virtual circuit, wherein the inter-cell delay is computed to have a negative correlation to the magnitude of to the corresponding allocated bandwidth;
    increment said line slot credit counter by a token value in each cell slot of said communication path, wherein said token value is determined by a length of duration of cell slots on said communication path;
    increment said VC-credit counter of each virtual circuit by one if said line slot credit counter of the corresponding virtual circuit is equal to or greater than said inter-cell delay and if said VC-credit counter is already not equal to a maximum number specified by corresponding virtual circuit;
    schedule a cell of said fourth virtual circuit for transmission in a slot only if said VC credit counter is greater than or equal to 1 for that slot;
    decrement said line slot credit counter by said inter-cell delay when said VC-credit counter is incremented; and
    decrement said VC-credit counter by one when a cell related to said fourth virtual circuit is scheduled for transmission.

35. The ATM device of claim 34, wherein said scheduler block is further operable to:
  compute a peak maximum slot credit and a peak intercell delay associated with said fourth virtual circuit if said fourth virtual circuit is of a type having a peak cell rate (PCR) in addition to allocated bandwidth, wherein said peak intercell delay and said peak maximum slot credit are computed to have a negative correlation with a magnitude of said PCR;
  initialize a peak slot credit associated with said fourth virtual circuit to zero;
  increment said peak slot credit by said token value in each cell slot, but said peak slot credit being capped at said peak maximum slot credit;
  decrement said peak slot credit by said peak intercell delay if a cell associated with said fourth virtual circuit is scheduled for transmission; and
  schedule for transmission a cell on said fourth virtual circuit only if said peak slot credit is greater than or equal to said peak intercell delay.

36. The ATM device of claim 35, wherein said maximum number equals 1 if said fourth virtual circuit is of CBR VC-type and greater than 1 in case of VBR-type.

37. The ATM device of claim 35, wherein said fourth virtual circuit is of VBR VC-type, and wherein said maximum number is computed according to the equation [MBS−(MBS×SCR/PCR)−1], wherein − and × respectively represent a subtraction and a multiplication operation, PCR represents peak cell rate, SCR represents sustained cell rate, and MBS represents maximum burst size of said fourth virtual circuit.

38. The ATM device of claim 35, wherein said ATM device comprises one of a CPE, a DSLAM, an ATM switch and a edge router.

39. The ATM device of claim 35, wherein said fifth virtual circuit is of UBR type.

40. The ATM device of claim 34, wherein said communication path has a line bandwidth, said line bandwidth equaling a line rate, wherein said plurality of virtual circuits comprise a plurality of VC-types, said ATM device further comprising:
  a memory storing data representing a configuration of said plurality of virtual circuits, wherein a sum of allocated bandwidths of said plurality of virtual circuits exceeds said line rate;
and
  a scheduler block scheduling for transmission said plurality of cells on said communication path while enforcing a pre-specified priority with respect to said plurality of VC-types and while limiting bandwidth usage by each of said plurality of virtual circuits to a corresponding allocated bandwidth.

41. The ATM device of claim 34, wherein said plurality of VC-types comprise constant bit rate (CBR) VC-type, variable bit rate-real time (VBR-RT) VC-type, variable bit rate—non real time (VBR-nRT) VC-type, wherein said pre-specified priority comprises highest to lowest priority for CBR VC-type, VBR-RT VC-type and VBR-nRT VC-type in that order, wherein a first cell related to a lower priority VC-type is scheduled for transmission only if no cells of a higher priority VC-type are ready for transmission.

42. The ATM device of claim 41, wherein said plurality of VC-types further comprises unspecified bit rate (UBR) VC-type, wherein UBR VC-type is given lower priority than said VBR-nRT VC-type.

43. The ATM device of claim 41, wherein said scheduler block is operable to:

determine cell slots in which of each of said plurality of virtual circuits is a candidate for allocation according to a corresponding allocated bandwidth, wherein a first virtual circuit of a first VC-type and a second virtual circuit of a second VC-type are determined to be candidates for allocation in a first cell slot on said communication path, wherein said first VC-type is different from said second VC-type; and allocate said first cell slot to one of said first virtual circuit and said second virtual circuit having a higher priority if the virtual circuit with the higher priority has a cell ready for transmission.

44. The ATM device of claim 43, wherein said scheduler block is further operable to allocate said first cell slot to one of said first virtual circuit and said second virtual circuit having a lower priority if the virtual circuit with the higher priority does not have a cell ready for transmission and if the virtual circuit with the lower priority has a cell ready for transmission.

45. The ATM device of claim 34, wherein said VC-credit counter for said fourth virtual circuit is incremented if said VC credit counter is greater than or equal to 1 for that slot even when at least one of a first condition and a second condition is true, wherein said first situation is in which a cell is not available on said fourth virtual circuit for transmission and said second situation is in which a cell on said fourth virtual circuit is available for transmission but not scheduled for transmission because a cell corresponding to some other eligible virtual circuit is transmitted.

\* \* \* \* \*